(12) United States Patent
Seifi et al.

(10) Patent No.: US 11,982,453 B2
(45) Date of Patent: May 14, 2024

(54) INCREMENTAL ACTUATOR WITH FEEDBACK CONTROL DIAGNOSTICS

(71) Applicant: Johnson Controls Tyco IP Holdings LLP, Milwaukee, WI (US)

(72) Inventors: Justin J. Seifi, Cedarburg, WI (US); Mark G. Freund, Wauwatosa, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 290 days.

(21) Appl. No.: 17/464,294

(22) Filed: Sep. 1, 2021

(65) Prior Publication Data

US 2022/0065476 A1 Mar. 3, 2022

Related U.S. Application Data

(60) Provisional application No. 63/073,510, filed on Sep. 2, 2020.

(51) Int. Cl.
*F24F 11/32* (2018.01)
*F24F 11/63* (2018.01)
*G05B 15/02* (2006.01)

(52) U.S. Cl.
CPC .............. *F24F 11/32* (2018.01); *F24F 11/63* (2018.01); *G05B 15/02* (2013.01)

(58) Field of Classification Search
CPC .......... F24F 11/32; F24F 11/63; G05B 15/02; G05B 2219/2614

USPC ........................................ 318/565, 563, 560
See application file for complete search history.

(56) References Cited

U.S. PATENT DOCUMENTS

| | | | | |
|---|---|---|---|---|
| 5,369,342 A | * | 11/1994 | Rudzewicz | ........ B60H 1/00814 |
| | | | | 318/102 |
| 8,084,982 B2 | * | 12/2011 | Grabinger | ............. F16K 31/046 |
| | | | | 318/634 |
| 9,641,122 B2 | * | 5/2017 | Romanowich | ....... H02H 7/0852 |
| 2020/0041153 A1 | | 2/2020 | Freund | |

* cited by examiner

*Primary Examiner* — David Luo
(74) *Attorney, Agent, or Firm* — Foley & Lardner LLP

(57) ABSTRACT

A controller for controlling operation of an actuator in an HVAC system is shown. The controller includes a processing circuit configured to receive, via a position sensor communicatively coupled to the actuator, a first voltage value, the first voltage value indicative of a first position of the actuator. The processing circuit is further configured to provide a control signal to the actuator to move to a second position. The processing circuit is further configured to, in response to the actuator moving to the second position, determine that the actuator is located in a different position than the second position based on a second voltage value via the position sensor. The processing circuit is further configured to automatically perform a fault correction process to calculate an updated stroke range of the actuator.

20 Claims, 12 Drawing Sheets

INCREMENTAL ACTUATOR WITH FEEDBACK CONTROL DIAGNOSTICS

CROSS-REFERENCE TO RELATED APPLICATION

This application claims the benefit of and priority to U.S. Provisional Patent Application 63/073,510 filed Sep. 2, 2020, the entire disclosure of which is incorporated by reference in its entirety.

BACKGROUND

The present disclosure relates generally to actuators for use in a heating, ventilation, or air conditioning (HVAC) system. More particularly, the present disclosure relates to systems and methods for controlling the position of incremental actuators with feedback control and for using feedback voltage monitoring and analysis for various configuration and diagnostic purposes.

HVAC actuators can be used to operate a wide variety of HVAC components such as air dampers, fluid valves, air handling units, and other components that are typically used in HVAC systems. For example, an actuator may be coupled to a damper in a HVAC system and may be used to drive the damper between an open position and a closed position. A HVAC actuator typically includes a motor and a drive device (e.g., a hub, a gear train, etc.) that is driven by the motor and coupled to the HVAC component.

HVAC actuators may typically require accurate position feedback for use in closed-loop control systems. Some HVAC actuators use floating control with incremental actuators to open or close the actuator based on flow requirements for a variable air volume (VAV) unit. An actuator implemented with floating control drives between a minimum rotational position and a maximum rotational position based on an input signal. One disadvantage of this method for actuator control is that the actual position of the actuator is not known, and over time, the actual position can differ from a calculated position. This effect is known as drift. Other HVAC actuators are proportional actuators that control the position of the drive device according to a value of DC voltage received. However, proportional actuators can require additional wiring to be installed and are generally more expensive than incremental actuators. U.S. patent application Ser. No. 16/529,652, entitled, "Incremental Actuator With Feedback Control", filed Aug. 1, 2019, and published as U.S. Patent Publication No. 2020/0041153A1, discloses a system and method for an incremental actuator that uses analog feedback voltage from a potentiometer to determine the actual physical position of a HVAC element driven by an actuator (e.g., a damper), allowing a more economical incremental actuator to run in a feedback mode that provides accurate calculated positions for the actuator.

SUMMARY

One implementation of the present disclosure is a controller for controlling operation of an actuator in a heating, ventilation, or air conditioning (HVAC) system. The controller includes a processing circuit configured to receive, via a position sensor communicatively coupled to the actuator, a first voltage value, the first voltage value indicative of a first position of the actuator. The processing circuit is further configured to provide a control signal to the actuator to move to a second position. The processing circuit is further configured to, in response to the actuator moving to the second position, determine that the actuator is located in a different position than the second position based on a second voltage value via the position sensor. The processing circuit is further configured to automatically perform a fault correction process to calculate an updated stroke range of the actuator.

In some embodiments, automatically performing the fault correction process includes determining an initial stroke range indicative of a time period for the actuator to move from a first endpoint to a second endpoint, instructing the actuator to move to the first endpoint for a first period greater than the initial stroke range, receiving a first test voltage signal at the first endpoint, instructing the actuator to move to the second endpoint for a second period greater than the initial stroke range, receiving a second test voltage signal at the second endpoint, and calculating the updated stroke range based on the initial stroke range, the first test voltage signal, and the second test voltage signal.

In some embodiments, the position sensor is a potentiometer. In some embodiments, the controller is configured to receive a plurality of voltage signals from the potentiometer, each of the plurality of voltage signals corresponding to a location between the first endpoint and the second endpoint, the plurality of voltage signals comprising the first voltage value and the second voltage value.

In some embodiments, calculating the updated stroke range includes calculating an effective stroke time, wherein the effective stroke time is a calculated period for the actuator to move from the first endpoint to the second endpoint.

In some embodiments, calculating the updated stroke range includes performing a calculation, the calculation including $$SR_U[V] = (V_H - V_L) * \left[\frac{ST_E}{ST_F}\right].$$

In some embodiments, $SR_U$ is the updated stroke range, $V_H$ is the first test voltage signal, $V_H$ is the second test voltage signal, $ST_E$ is the effective stroke time, and $ST_F$ is a full stroke time. In some embodiments, the full stroke time is a predetermined period for the actuator to complete the initial stroke range.

In some embodiments, automatically performing the fault correction process includes determining that the actuator is located substantially close to the second position, determining that a fault has occurred due to actuator drift, and performing the fault correction process to correct for the actuator drift.

In some embodiments, performing the fault correction process to correct for the actuator drift includes performing a periodic overdrive sequence to resynchronize the actuator.

Another implementation of the present disclosure is a method for controlling operation of an actuator in a heating, ventilation, or air conditioning (HVAC) system. The method includes receiving, via a position sensor communicatively coupled to the actuator, a first voltage value, the first voltage value indicative of a first position of the actuator. The method further includes providing a control signal to the actuator to move to a second position. The method further includes, in response to the actuator moving to the second position, determining that the actuator is located in a different position than the second position based on a second voltage value via the position sensor. The method further includes automatically performing a fault correction process to calculate an updated stroke range of the actuator.

In some embodiments, automatically performing the fault correction process includes determining an initial stroke range indicative of a time period for the actuator to move from a first endpoint to a second endpoint, instructing the actuator to move to the first endpoint for a first period greater than the initial stroke range, receiving a first test voltage signal at the first endpoint, instructing the actuator to move to the second endpoint for a second period greater than the initial stroke range, receiving a second test voltage signal at the second endpoint, and calculating the updated stroke range based on the initial stroke range, the first test voltage signal, and the second test voltage signal.

In some embodiments, the position sensor is a potentiometer. In some embodiments, the method further includes receiving a plurality of voltage signals from the potentiometer, each of the plurality of voltage signals corresponding to a location between the first endpoint and the second endpoint, the plurality of voltage signals comprising the first voltage value and the second voltage value.

In some embodiments, calculating the updated stroke range comprises calculating an effective stroke time, wherein the effective stroke time is a calculated period for the actuator to move from the first endpoint to the second endpoint.

In some embodiments, calculating the updated stroke range includes performing a calculation, the calculation including $$SR_U[V] = (V_H - V_L) * \left[\frac{ST_E}{ST_F}\right].$$

In some embodiments, $SR_U$ is the updated stroke range, $V_H$ is the first test voltage signal, $V_H$ is the second test voltage signal, $ST_E$ is the effective stroke time, and $ST_F$ is a full stroke time. In some embodiments, the full stroke time is a predetermined period for the actuator to complete the initial stroke range.

In some embodiments, automatically performing the fault correction process includes determining that the actuator is located substantially close to the second position, determining that a fault has occurred due to actuator drift, and performing the fault correction process to correct for the actuator drift.

In some embodiments, performing the fault correction process to correct for the actuator drift includes performing a periodic overdrive sequence to resynchronize the actuator.

Another implementation of the present disclosure is a control system for controlling operation of an actuator in a heating, ventilation, or air conditioning (HVAC) system. The control system includes the actuator communicatively coupled to a position sensor and a controller including a processing circuit configured to receive, via the position sensor, a first voltage value, the first voltage value indicative of a first position of the actuator. The processing circuit is further configured to provide a control signal to the actuator to move to a second position. The processing circuit is further configured to, in response to the actuator moving to the second position, determine that the actuator is located in a different position than the second position based on a second voltage value via the position sensor. The processing circuit is further configured to automatically perform a fault correction process to calculate an updated stroke range of the actuator.

In some embodiments, automatically performing the fault correction process includes determining an initial stroke range indicative of a time period for the actuator to move from a first endpoint to a second endpoint, instructing the actuator to move to the first endpoint for a first period greater than the initial stroke range, receiving a first test voltage signal at the first endpoint, instructing the actuator to move to the second endpoint for a second period greater than the initial stroke range, receiving a second test voltage signal at the second endpoint, and calculating the updated stroke range based on the initial stroke range, the first test voltage signal, and the second test voltage signal.

In some embodiments, the position sensor is a potentiometer. In some embodiments, the controller is configured to receive a plurality of voltage signals from the potentiometer, each of the plurality of voltage signals corresponding to a location between the first endpoint and the second endpoint, the plurality of voltage signals comprising the first voltage value and the second voltage value.

In some embodiments, calculating the updated stroke range comprises calculating an effective stroke time, wherein the effective stroke time is a calculated period for the actuator to move from the first endpoint to the second endpoint.

In some embodiments, calculating the updated stroke range includes performing a calculation, the calculation including $$SR_U[V] = (V_H - V_L) * \left[\frac{ST_E}{ST_F}\right].$$

In some embodiments, $SR_U$ is the updated stroke range, $V_H$ is the first test voltage signal, $V_H$ is the second test voltage signal, $ST_E$ is the effective stroke time, and $ST_F$ is a full stroke time. In some embodiments, the full stroke time is a predetermined period for the actuator to complete the initial stroke range.

In some embodiments, automatically performing the fault correction process includes determining that the actuator is located substantially close to the second position, determining that a fault has occurred due to actuator drift, performing the fault correction process to correct for the actuator drift.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
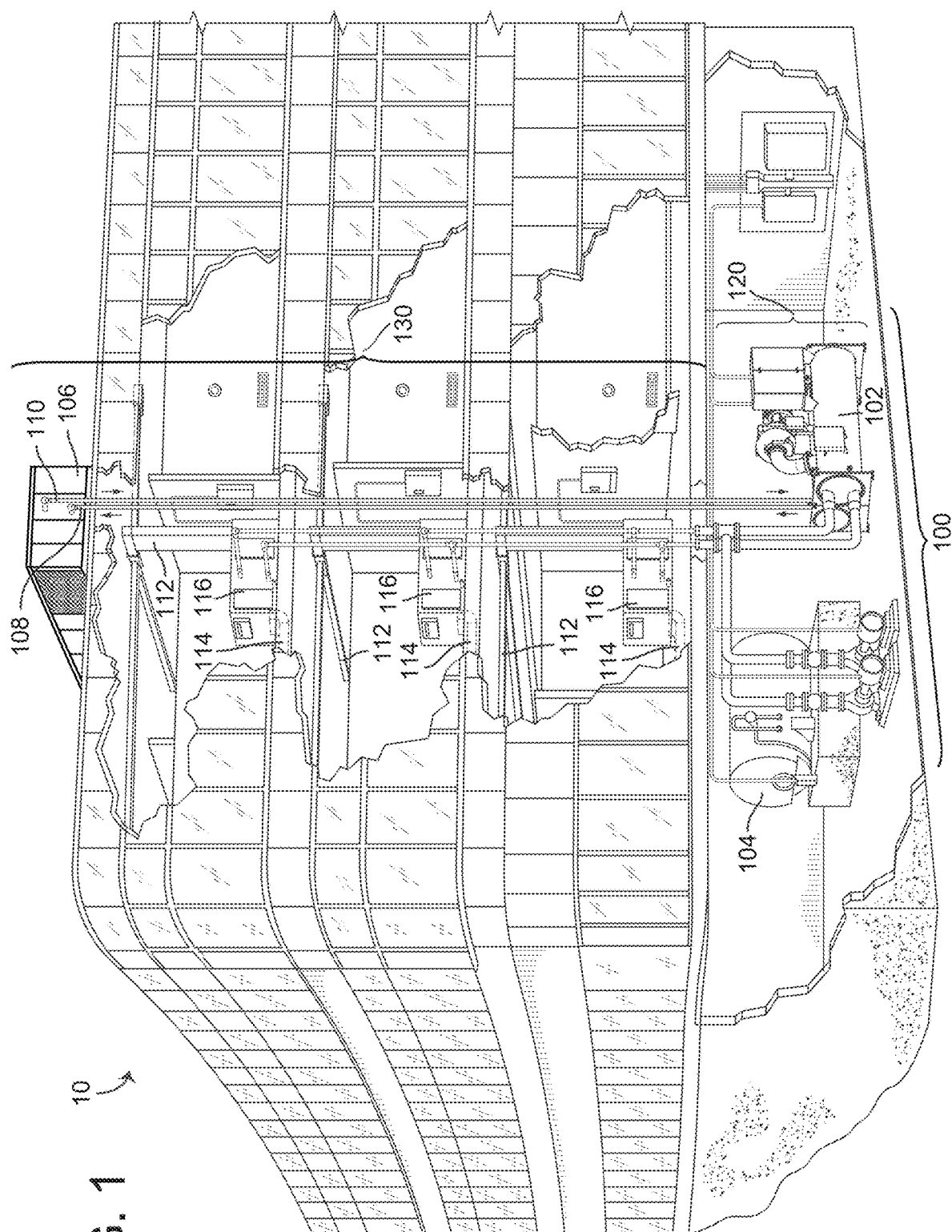
FIG. 1 is a drawing of a building equipped with a heating, ventilating, or air conditioning (HVAC) system and a building management system (BMS), according to an exemplary embodiment.

Before turning to the FIGURES, which illustrate the embodiments in detail, it should be understood that the disclosure is not limited to the details or methodology set forth in the description or illustrated in the FIGURES. It should also be understood that the terminology is for the purpose of description only and should not be regarded as limiting.

Some embodiments and implementations of the systems and methods disclosed herein improve current HVAC systems by providing an incremental actuator with feedback control and diagnostics. For example, the incremental actuator may be a damper actuator. In other embodiments, the incremental actuator may be a valve actuator, a fan actuator, a pump actuator, or any other type of actuator that can be used in a HVAC system that uses incremental or floating control for the actuator.

The incremental actuator includes a potentiometer to measure the position of the incremental actuator. In some embodiments, the potentiometer is incorporated into the gear train for the incremental actuator. In other embodiments, the potentiometer is external to the incremental actuator (e.g., wired to an external analog input of the actuator, etc.). The potentiometer provides feedback to the controller corresponding to the position of the incremental actuator by providing a voltage signal proportional to the position. A position feedback controller converts the voltage signal from the potentiometer to a position value. Furthermore, the position feedback controller auto-calibrates the position values by adjusting the voltage signal limits as each of the actuator endpoints or end stops is reached. The high and low voltage values can be measured and can correspond with the endpoints of the incremental actuator (e.g., from 0% to 100%, where 0% may correspond with a fully closed damper and 100% may correspond with a fully open damper). The position feedback controller may further perform one or more processes based on potentiometer feedback to calculate the current position of the incremental actuator, overcoming the effect of drift. While the systems and methods disclosed herein generally refer to potentiometers, this is merely meant to be exemplary and should not be considered limiting. For example, any type of position sensors can be used in place of the potentiometer(s), such as eddy current-based position sensors, capacitive position sensors, magnetostrictive position sensors, hall effect-based magnetic position sensors, linear potentiometers, rotatory potentiometers, or any combination thereof.

The controller may use position feedback monitoring as described above to perform additional configuration and diagnostic analyses of the incremental actuator, in some embodiments. For example, the controller receives the actuator's default hardware data, such as the actuator's default full stroke time and associated voltage endpoint values, and compares these values to the actuator's configured effective stroke time values, to determine whether the actuator has actually been installed for its full range of movement. This method beneficially confirms upon installation that the actuator is, in fact, installed for its full movement range.

In some instances, an actuator may be mounted for less than its full range of movement. The position feedback controller cannot know precisely where the installer has mounted the actuator or the actuated HVAC element to which it is attached. For example, for an actuator with a 90 degree range of full rotary movement and a full stroke time of 60 seconds, a 45 degree mount should translate to a 30 second travel period in order for the actuator to move its full range. If the normal voltage range is 0.3V to 1.9V (a range of 1.6V for a 90 degree movement), it may be expected that a 45 degree mount voltage range to be 0.8 V (e.g., 0.3V to 1.1V, etc.). However, the actual values for low endpoint voltage (equivalent to the closed position) and high endpoint voltage (equivalent to the open position) could vary between, e.g., 0.6 V (low) to 1.4 V (high), or 0.8 V (low) to 1.6 V (high), or 0.3V (low) to 1.1 V (high). In other words, it is impossible to know for certain the actual voltage low and high values without further analysis. Where the position feedback controller detects, by comparing hardware default values with installation-configured values (as described above) that the actuator is installed for less than its full range of movement, it automatically determines, through analysis of voltages measured during overdrive sequences, the actuator's actual range of movement and the associated voltage endpoints.

One disadvantage of using overdrive sequences in order to determine an actuator's actual full voltage range, is that it is generally not guaranteed that the actuator will overdrive to its open position following an overdrive closed. This may occur where, for example, the controller detects that a current temperature set point has been met and therefore an open command is not generated. The present disclosure describes a method of estimating an open position voltage in order to address this issue.

Additionally, the present disclosure describes methods of measuring the true stroke time of an incremental actuator by using overdrive sequences, voltage feedback measurements, and the speed of the actuator to determine the actual time taken for the actuator to travel its full permitted range of movement. Where, in particular, an actuator has been installed for less than its full movement range, the accurate configuration of the actuator's effective stroke time is essential for the controller to calculate incremental positions and movement commands. The disclosed method beneficially provides a means of identifying when a configured effective stroke time is inaccurate.

Further, a method of detecting a stall, blocked, or decoupled condition of an incremental actuator is disclosed. By analyzing feedback voltages received from a potentiometer and comparing these values to expected voltage values associated with the target position, the controller may determine that the difference in value exceeds a threshold on a number of consecutive occasions. The disclosed method beneficially provides a means of detecting a mechanical issue, allowing the actuator to be stopped to prevent physical damage to it and its associated components.

Advantageously, incremental actuators are more affordable for consumers to purchase and can utilize existing controllers (e.g., modular assemblies for VAV controllers) for ease of installation. By providing an accurate current position of the actuator, the incremental actuator with feedback control can be utilized in air handling unit (AHU) applications and may aid in optimizing AHU fan speed and cold air temperature parameters, to name a few examples. Additional features and advantages of the present invention are described in greater detail below.

Building Management System and HVAC System

Referring now to FIGS. 1-4, an exemplary building management system (BMS) and HVAC system in which the systems and methods of the present invention may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
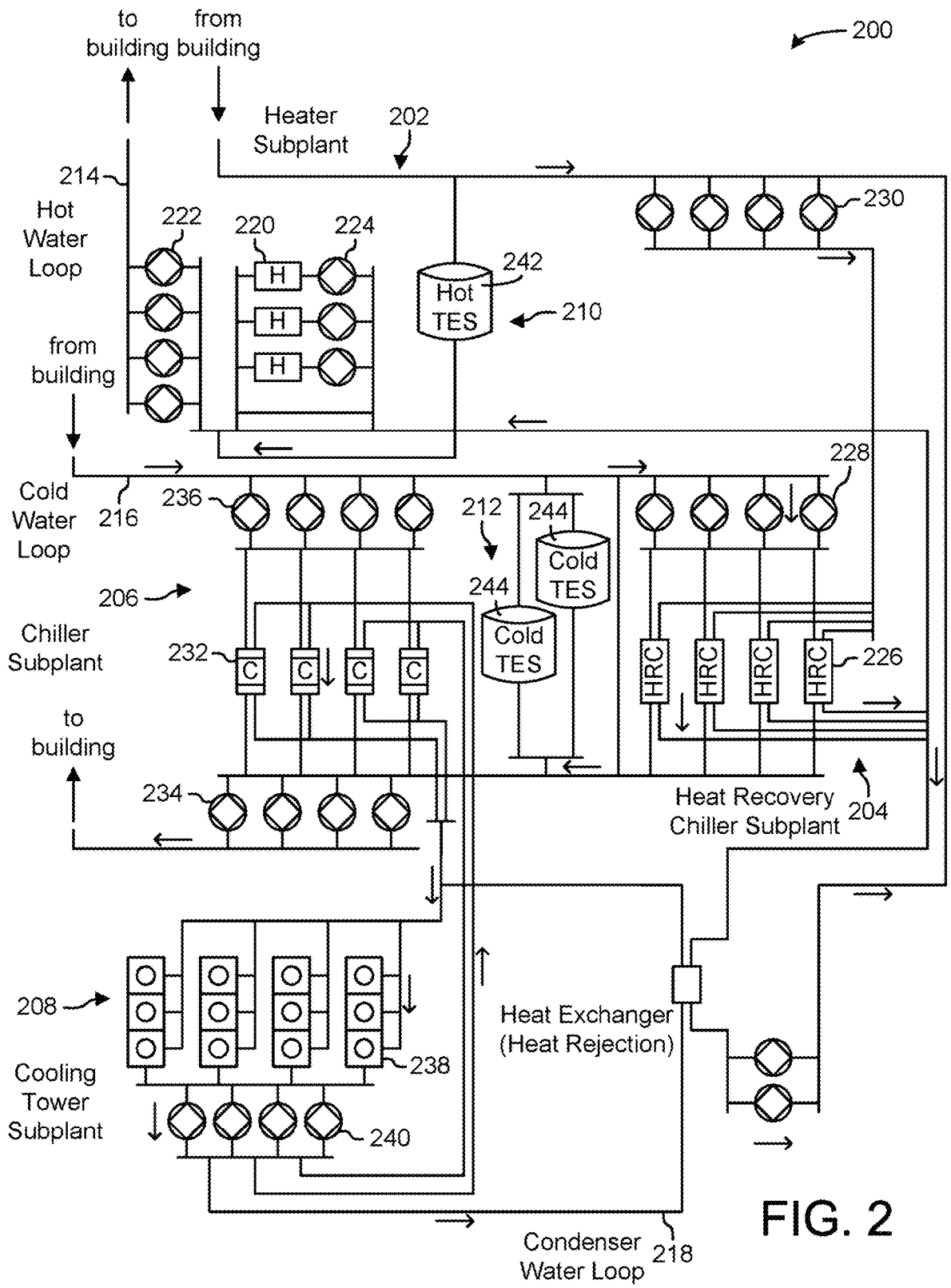
FIG. 2 is a schematic diagram of a waterside system which may be used to support the HVAC system of FIG. 1, according to an exemplary embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 and building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
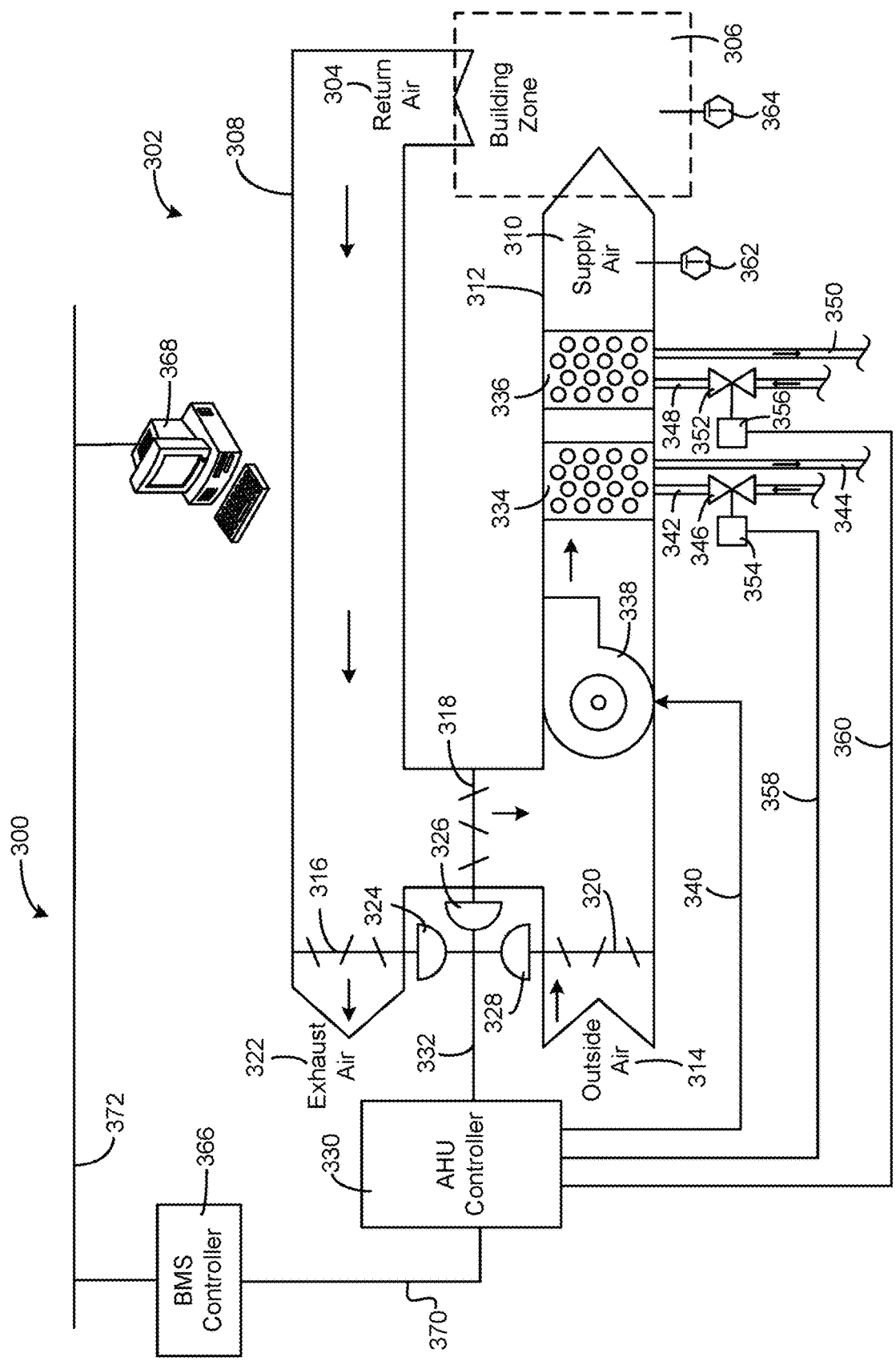
FIG. 3 is a block diagram of an airside system which may be used as part of the HVAC system of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
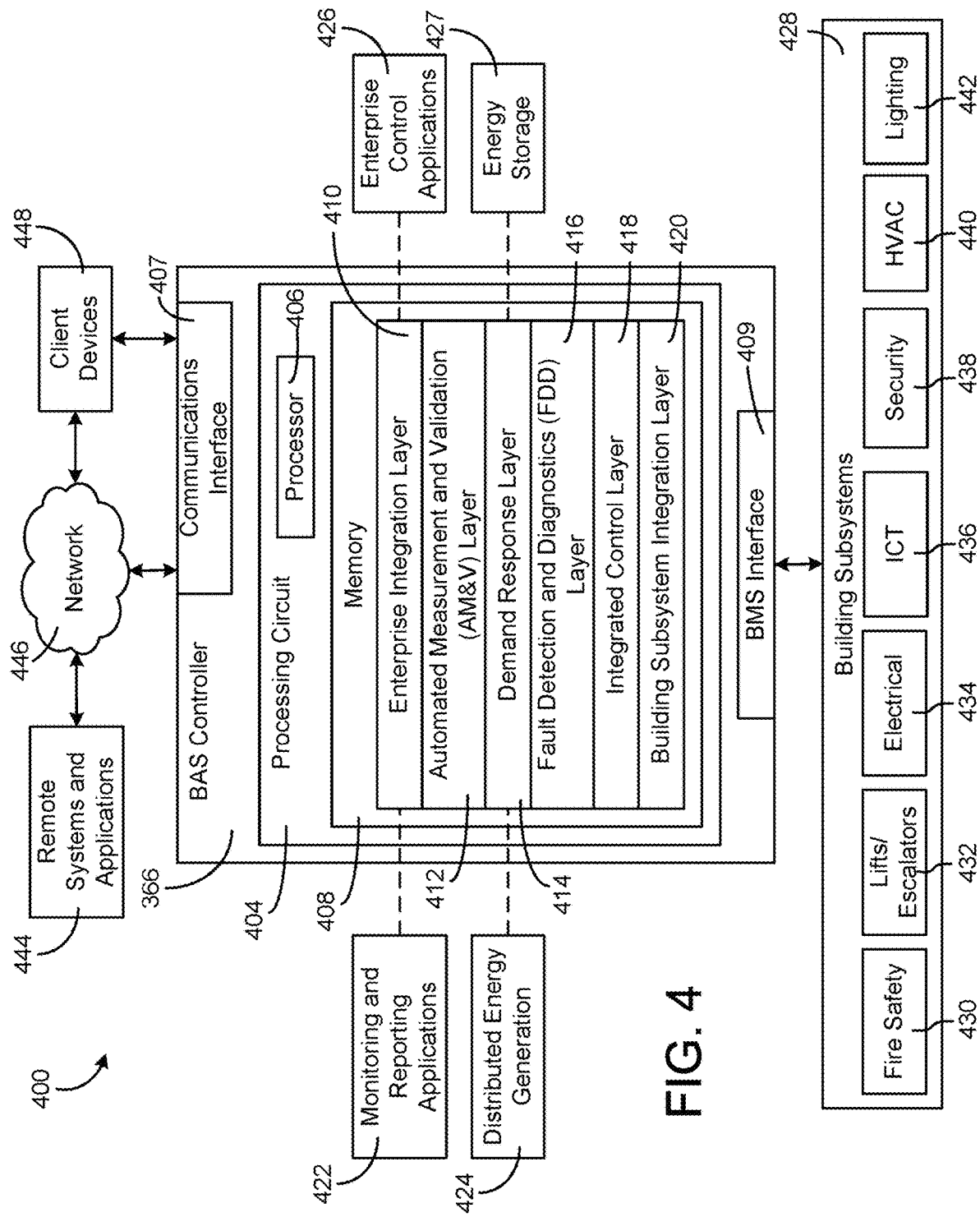
FIG. 4 is a block diagram of a BMS which may be implemented in the building of FIG. 1, according to an exemplary embodiment.

Referring now to FIG. 4, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include and number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translates communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Incremental Actuator with Feedback Control

Figure 5:
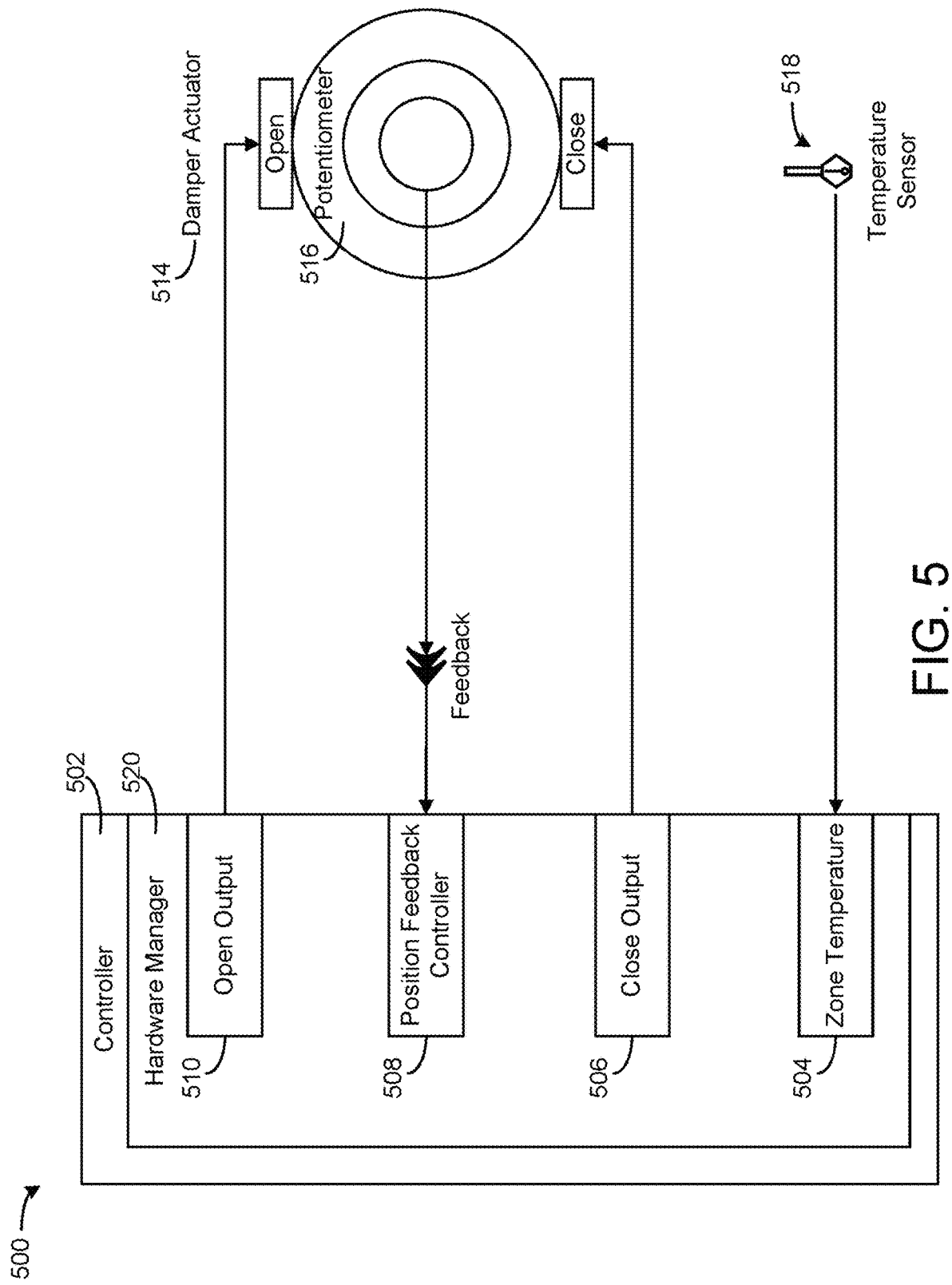
FIG. 5 is a block diagram of an incremental actuator and feedback control system that can be utilized in the HVAC system of FIG. 1, according to an exemplary embodiment.
Figure 6:
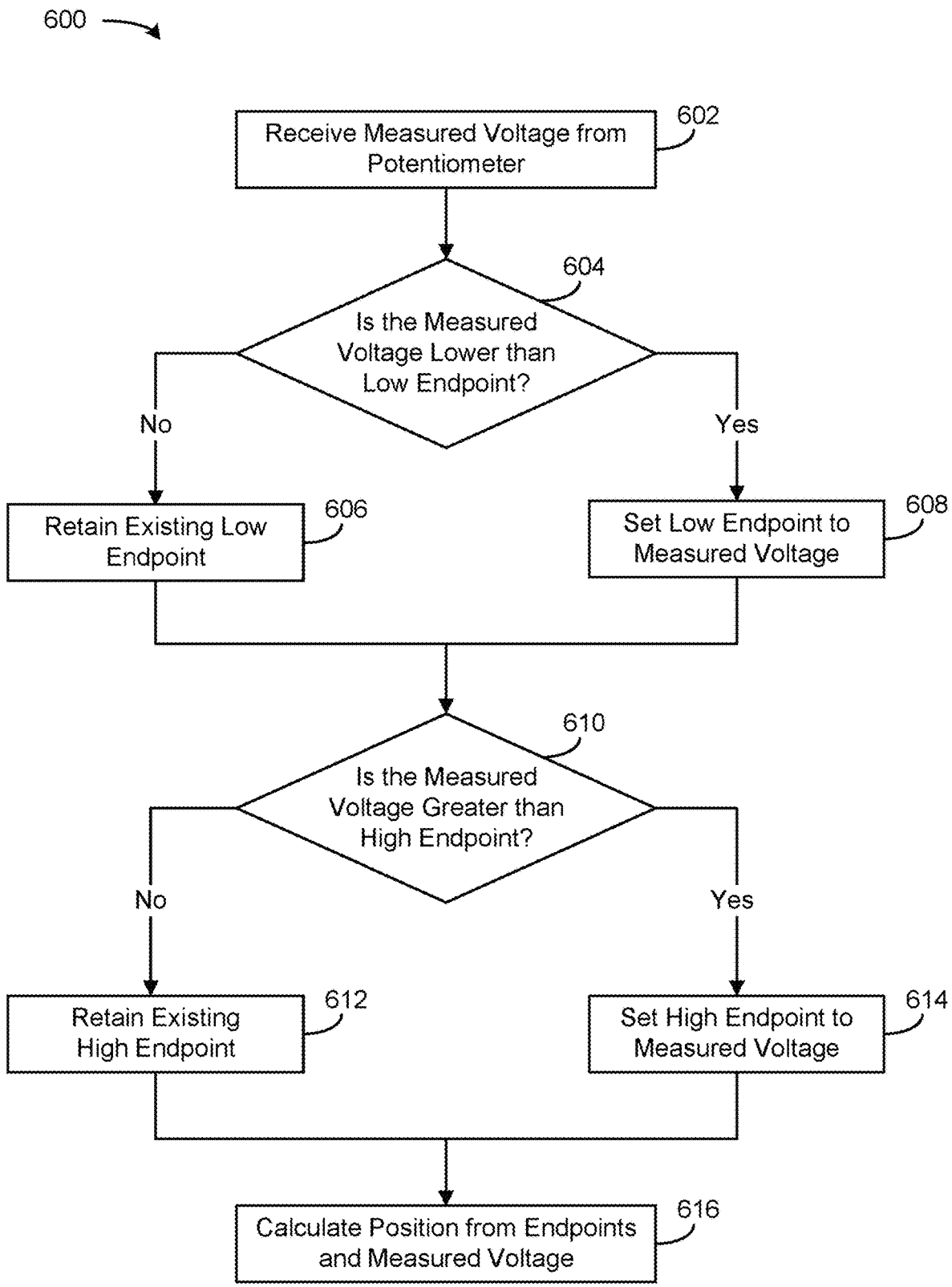
FIG. 6 is a flow diagram of a process for determining the position of the incremental actuator of FIG. 5, according to an exemplary embodiment.
Figure 7:
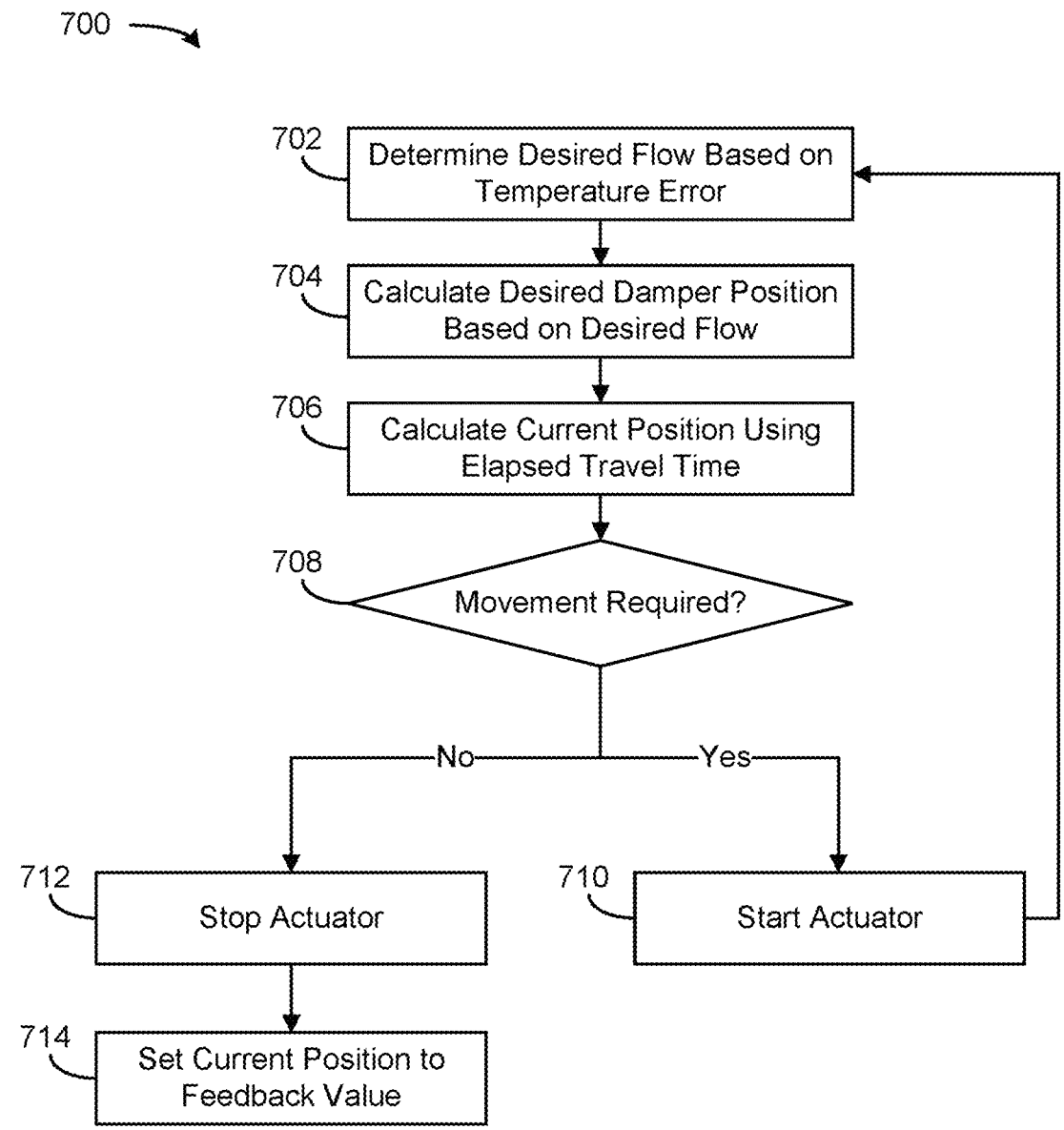
FIG. 7 is a flow diagram of a process for controlling the incremental actuator of FIG. 5, according to an exemplary embodiment.

Referring now to FIGS. 5-7, systems and methods to control an incremental actuator with position feedback are shown, according to some embodiments. In brief overview, FIG. 5 is a block diagram of an incremental actuator interacting with a controller, according to some embodiments. FIG. 6 is a flow diagram of a process for determining the calculated position of an incremental actuator, according to some embodiments. FIG. 7 is a flow diagram of a process for controlling an incremental actuator using position feedback from a potentiometer, according to some embodiments.

Referring now to FIG. 5, a block diagram of an incremental actuator and feedback control system 500 is depicted. In various embodiments, the incremental actuator and feedback control system 500 may be used in the HVAC system of FIG. 1, the waterside system of FIG. 2, the airside system of FIG. 3, or the BMS of FIG. 4 to control a HVAC component. Incremental actuator and feedback control system 500 is shown to include a controller 502 that is communicably coupled to a damper actuator 514 and a temperature sensor 518. In some embodiments, controller 502 can be implemented within a single computer (e.g., one server, one housing, etc.). In other embodiments, controller 502 can be distributed across several servers or computers (e.g., that can exist in distributed locations). Furthermore, applications that are carried out by system 500 may exist outside controller 502 or may be hosted within controller 502 (e.g., within memory).

Damper actuator 514 can be configured as an incremental actuator that drives a damper used within an airside system (e.g., airside system 300, as described in detail with reference to FIG. 3). In other embodiments, the incremental actuator drives other components of a HVAC system, such as a fan, a valve, or a pump. Damper actuator 514 can be connected to controller 502 and potentiometer 516 to communicate information on the position of the incremental actuator. In some embodiments, damper actuator 514 is powered by an AC power supply (e.g., the electric utility of building 10) through a wired interface.

Controller 502 is shown to include various components or circuits, including, but not limited to a zone temperature circuit 504, a close output circuit 506, a position feedback controller circuit 508, and an open output circuit 510. Each of the circuits 504-510 may be a subcomponent of a hardware manager 520. Zone temperature 504 can be configured to store information on temperatures for a zone (i.e., a portion of a building, such as a room or a floor) within controller 502. Furthermore, zone temperature 504 may contain applications that calculate a difference or error value between a desired temperature and a calculated temperature. The desired zone temperature may be received from a supervisory controller, from a thermostat or other user device, or from any other source. In some embodiments, this calculation can then be used to determine whether the zone needs more cold airflow to lower the temperature of the room or if the zone is too cold and needs an increase in temperature. Thus, zone temperature 504 can be used for defining the desired airflow to a zone within a building (e.g., building 10). Temperature sensor 518 can be any type of temperature sensor and can be configured to provide real time information to the actuator controller on temperatures of a zone. In some embodiments, temperature sensor 518 provides data points of air temperature in the zone that include a measured data value indicating the temperature measured by the temperature sensor. The data points from temperature sensor 518 can also include timestamps of when the temperature was measured by the temperature sensor.

Still referring to FIG. 5, close output 506 can be configured to send a signal from the controller to an incremental actuator (e.g., damper actuator 514) to close the actuator a certain amount. Close output 506 may contain information in controller 502 on how much the position of the incremental actuator may close in order to maintain a desired airflow. For example, close output may contain a voltage value that corresponds with a position of damper actuator 514, such that the incremental actuator will continue to close until it reaches that position. Open output 510 can also be configured to send a signal from a controller to an incremental actuator (e.g., damper actuator 514), but instead of closing the position, the signal may provide information to open the position a certain amount. In some embodiments, closing the incremental actuator completely means the actuator has a corresponding position value of 0%, while opening the incremental actuator completely means the actuator has a corresponding position value of 100%.

Potentiometer 516 can be configured to produce a voltage signal that is proportional to the position of the incremental actuator (e.g., 0-100% open, etc.) and to output the voltage signal to the position feedback controller 508 of the incremental actuator. In some embodiments, potentiometer 516 is attached to a gear train of the incremental actuator in order to provide position feedback to the position feedback controller 508 through an internal connection to an analog to digital converter (ADC). In other embodiments, potentiometer 516 is external to the incremental actuator 514 (e.g., wired to an external analog input of the actuator).

The position feedback controller 508 may be responsible for processing inputs and outputs of the actuator controller. The position feedback controller 508 may also be programmed to execute a hardware manager application that converts voltage values from potentiometer 516 to position values and provides an actual position of the incremental actuator to a control primitive. In some embodiments, the control primitive is a Position Adjust Output (PAO). The control primitive PAO can be responsible for managing the position of the incremental actuator (e.g., damper actuator 514). The hardware manager 520 also can auto-calibrate the position value by adjusting signal limits as each endpoint of the incremental actuator is reached. Further details of this auto-calibration process are included below with reference to FIG. 6. In order to prevent operational failure of the incremental actuator, if the position feedback signal from the potentiometer (e.g., potentiometer 516) is lost, the actuator continues using incremental control without position feedback. The PAO can be configured to establish a connection to the hardware manager 520 and to ask for a valid position feedback signal from the potentiometer. If the position feedback signal exists and is also reliable, the hardware manager 520 can send updates of the position value to a current instance of the PAO object.

Referring now to FIG. 6, a flow diagram of process 600 for determining the calculated position of an incremental actuator is shown, according to some embodiments. Process 600 may be completed by various components of system 500, as described in detail with reference to FIG. 5. In some embodiments, process 600 can be executed in part by an application associated with BMS 400. Process 600 provides an overview of a way to determine the current position of an incremental actuator using feedback from a potentiometer. Process 600 can be used for HVAC systems, such as airside system 300, described in detail with reference to FIG. 3. In some embodiments, process 600 is performed each time the incremental actuator stops.

The calculated position of the incremental actuator allows the HVAC system (e.g., HVAC system 100, described in detail with reference to FIG. 1) to open and close the actuator to satisfy airflow requirements while preventing a drift effect. The drift effect occurs when an actuator is open and closed without attention to the actual position of the actuator. The inattention to the actual position of the actuator results in inaccurate information of the position of the actuator, such that the actual current position of the actuator may vary greatly ("drift") from the calculated position. By continually updating information on the position of the incremental actuator, process 600 can inhibit drift effects in incremental actuators.

Furthermore, knowledge of the position of the actuator can be useful in newer AHU applications. For example, the actuator position can be used to optimize AHU fan speed and cold air temperatures in HVAC systems. However, the operation of the incremental actuator does not depend on an actuator position feedback signal from the potentiometer being received and the completion of process 600. For example, if the feedback signal from the potentiometer on the actuator position feedback is lost during process 600, the actuator can continue to operate normally using incremental control to meet the airflow requirements.

Process 600 is shown to include receiving a measured voltage from a potentiometer (step 602) and determining if the measured voltage signal from the potentiometer position feedback is less than a low endpoint threshold of the incremental actuator (step 604). In some embodiments, a potentiometer (e.g., potentiometer 516) is configured to produce a voltage signal that is proportional to a position of the incremental actuator. After the actuator controller (e.g., controller 502) receives the position feedback from the potentiometer, the hardware manager 520 processes the input and converts the measured voltage to a corresponding percentage value of the incremental actuator position. For example, if the measured voltage signal is equivalent to the lower endpoint threshold of the actuator position, the hardware manager 520 converts the measured voltage value to a position value of 0%. The value of the position for the incremental actuator may then be stored in memory of the position feedback controller 508 to be used for decisions to open or close the actuator based on zone temperature feedback. The low position endpoint may also be stored in memory in position feedback controller 508.

If the measured voltage from the potentiometer is found to be less than the low endpoint threshold of the incremental actuator, process 600 is shown to set the low endpoint to equal the measured voltage from the potentiometer feedback (step 608). The low endpoint of the actuator position may be stored in position feedback controller 508 and rewritten by controller 502 to equal the position from the most recent measured voltage that is less than the voltage value for the current low endpoint. After the low endpoint threshold has been updated to be the position corresponding to the measured voltage reading from the potentiometer position feedback, process 600 continues to step 610.

However, if the measured voltage from the potentiometer is found to be greater than the low endpoint threshold of the incremental actuator, process 600 is shown to proceed with step 606 before determining if the voltage from the potentiometer is greater than the high endpoint threshold of the incremental actuator (step 610). In some embodiments, controller 502 uses the hardware manager 520 to compare voltages for the most recent potentiometer position feedback value and the low endpoint position value. After determining that the low endpoint position voltage value is still lower than the most recent voltage value measured from position feedback, controller 502 can retain the current low endpoint position (step 606) before continuing to step 610 of process 600.

Process 600 is further shown to include determining if the measured voltage signal from potentiometer position feedback is greater than the high endpoint threshold of the incremental actuator (step 610). If the measured voltage from the potentiometer is found to be greater than the high endpoint of the incremental actuator in step 610, process 600 is shown to proceed with setting the high endpoint threshold of the incremental actuator equal to the value of the measured voltage from feedback (step 614). For example, if the measured voltage signal is equivalent to the higher endpoint of the actuator position, the hardware manager 520 converts the measured voltage value to a position value of 100%. The high endpoint of the actuator position may be stored in position feedback controller 508 and rewritten by controller 502 to equal the position from the most recent potentiometer position feedback that is greater than the voltage value for the current high endpoint threshold. After the high endpoint has been set to the measured voltage reading from the potentiometer position feedback, process 600 continues to step 616 to calculate the position of the incremental actuator. However, if the voltage from potentiometer feedback is found to be lower than the current high endpoint, process 600 is shown to proceed with retaining the current high endpoint (step 612) before calculating the position of the incremental actuator in step 616.

Process 600 is shown to include calculating the position of the incremental actuator from the endpoints of the incremental actuator and measured voltage from potentiometer position feedback (step 616). In some embodiments, step 616 is accomplished by controller 502 and values stored in position feedback controller 508. For example, the hardware manager 520 can compare the voltage values for the low position endpoint and high position endpoint with the measured voltage value from potentiometer 516 to calculate what percentage from the low position endpoint to the high position endpoint the measured voltage value falls. Based on that comparison, controller 502 can calculate the percentage of total distance, from one endpoint to the other endpoint, the position of the incremental actuator is away from the low endpoint position.

Referring now to FIG. 7, a flow diagram of process 700 for controlling the incremental actuator of FIG. 5 using feedback from a potentiometer is shown, according to some embodiments. In some embodiments, process 700 is completed by multiple components of system 500, described with reference to FIG. 5, to improve management of HVAC systems, such as airside system 300. Steps within process 700 may occur after or concurrently with process 600 and may use information produced by process 600 to control the incremental actuator (e.g., damper actuator 514) within the HVAC system.

Process 700 is shown to include determining a desired flow rate based on a zone temperature error (step 702). In various embodiments, process 700 may be performed every time the zone temperature error exceeds a certain threshold (e.g., the zone temperature error exceeds 0.5 degrees), or every time controller 502 receives a new zone temperature setpoint (e.g., a user changes a thermostat setting for a building zone). Controller 502 may be configured to determine a temperature error and a desired flow rate for an airside system using information from a temperature sensor (e.g., temperature sensor 518), which may be stored and processed in zone temperature 504. For example, temperature sensor 518 can be configured to communicate to controller 502 that a zone has a current temperature of 79° F., whereas the desired temperature setpoint of the zone is 72° F. Thus, the temperature error of the zone is 7° F. and controller 502 can be configured to determine that there needs to be an increase in airflow to the zone in order to cool down the temperature.

Process 700 is shown to include calculating a desired damper actuator position based on the desired flow rate setpoint through the damper (step 704). Controller 502 and other components of system 500, described in detail with reference to FIG. 5, can be used in completing step 704. For example, if the temperature of a zone is greater than the desired temperature setpoint, an increase in airflow to the zone may be used to lower the temperature of the zone. Therefore, a controller (e.g., controller 502) can determine that the damper should be opened more in order to permit more air to flow through to the zone and to calculate the actuator position setpoint that would allow the correct amount of air to flow into the zone.

Process 700 is shown to include updating the current position based on how much time has elapsed since the actuator began moving (step 706). If the actuator has not yet begun to move, a controller (e.g., controller 502) can utilize the actuator's last calculated position. If the actuator has begun moving, the controller can calculate the actuator's current position based on the stroke time of the actuator and the commanded actuator position setpoint. For example, if the actuator has a stroke time of 100 seconds to move from a low endpoint or fully closed (i.e., 0% open) position to a high endpoint or fully open (i.e., 100% open) position, if the actuator has been moving for 10 seconds from a fully closed position, the controller will calculate that the actuator is in a 10% open position.

Process 700 is further shown to include determining whether the incremental actuator must begin to move or keep moving in order to reach the actuator position setpoint (step 708). In some embodiments, this is accomplished by comparing the calculated current position, determined in step 706, with the desired position setpoint, determined in step 704 and determining whether the current position is equal to the desired position setpoint. For example, a controller (e.g., controller 502) can use information stored about position feedback relating to the current position and calculate a difference between the current position and the desired position. Then, based on the difference between the current position and the desired position, the controller may determine whether an incremental actuator for the damper (e.g., damper actuator 514) is going to open more, close more, or not make any changes to position. For example, if the desired position is fully open and the current position is only half open, then a movement is required and the controller can send a signal to the damper incremental actuator to increase its position to be more open.

If actuator movement is required, process 700 is shown to include starting the actuator (step 710). In some embodiments, starting the actuator may include a controller (e.g., controller 502) commanding open or close output with remaining onTime (step 710). OnTime can be a variable the controller sends to the incremental actuator that informs the actuator how long to remain "on" while changing position. In some embodiments, the primitive control PAO from the controller (e.g., controller 502) for the incremental damper actuator commands the damper to close a specific amount using close output 506. In other embodiments, the next movement required is to open the damper more, thus the controller commands the incremental actuator to open more than its current position using open output 510. PAO can incrementally move the actuator to its new position, updating its calculated position as it moves based on the elapsed travel time since the actuator began moving. As soon as the onTime is over, the incremental actuator can be considered to be "off" and can stop movement, signaling that movement is no longer necessary in order to change the position. Process 700 can then return to step 702 to determine whether the zone temperature error persists.

If a movement is not required at step 708, process 700 is shown to include stopping the incremental actuator (step 712). The controller of the incremental actuator, in this case an incremental damper actuator (e.g., damper actuator 514), can send a signal to the actuator to stop any further movements to change the position. For example, once the incremental actuator has changed the position to be equal or close to the calculated desired position, the incremental actuator no longer needs to open or close more. In some embodiments, the controller (e.g., controller 502) sends a signal to stop the incremental actuator via a communications interface that is similar to communications interface 407 of the building management system, described in detail with reference to FIG. 4.

Once the actuator is stopped after step 712, process 700 is shown to include setting the current position to a feedback value (step 714). In some embodiments, the current position of the incremental damper actuator (e.g., damper actuator 514), is set equal to the feedback value from a potentiometer (e.g., potentiometer 516) by the Hardware Manager of the position feedback controller 508. Furthermore, the feedback value can be a voltage signal produced by the potentiometer that corresponds with a position of the actuator based on the voltages for two endpoint positions. The hardware manager 520 can overwrite the calculated position of the actuator based on the travel time with the new current position. To update the current position, the PAO can verify that a feedback signal is being received by the controller and that the signal is reliable before the hardware manager 520 sends value updates. The current position of the actuator can be stored in memory within controller 502 to be accessed later by the controller. In some embodiments, controller 502 contains memory that is similar to memory 408 of the BMS controller, described in detail with reference to FIG. 4. After the current position of the actuator is updated and saved, it can be used in applications where knowing the actual position of the incremental actuator (e.g., damper actuator 514) can be beneficial, such as in AHUs to optimize fan speed or optimize cold air temperature.

Feedback Mode Diagnostic Processes

Referring now generally to FIGS. 8-12, various methods are described for performing analyses on an incremental actuator with feedback control system, such as the system of FIG. 5, according to some embodiments.

Voltage signals received from potentiometer 516 allow controller 502 to instruct the hardware manager 520 to perform additional analysis, described further below, on the configuration and performance of an incremental actuator. Without feedback voltage position monitoring, over time, estimated logical positions (i.e., voltage values, calculated as percentages of a full stroke of the actuator) tend to drift away from the actuator's real physical positions. To compensate for this drift, the controller is configured to use periodic overdrive sequences to resynchronize the control output voltage values with the true incremental positions of the actuator. An overdrive sequence occurs when the controller commands the actuator to move towards each of its physical endpoints for a minimum travel period that exceeds the actuator's default Full Stroke Time. So, for example, if an actuator has a default Full Stroke Time of 60 seconds, a minimum travel period for an overdrive command might be 90 seconds. The actuator's default Full Stroke Time is a model-specific value provided by the manufacturer representing the time the actuator should take to travel its full range of movement. This default Full Stroke Time value does not, however, account for any physical limitations on the actuator's actual range of movement when in its installed condition. By measuring the voltage feedback signals from the potentiometer when the actuator has reached each physical endpoint, the controller can update the endpoint voltage values representing the actuator's actual stroke range (its effective stroke) and recalibrate the incremental control output voltage values. Overdrive sequences can cause physical damage to an actuator and the components to which it is attached, so they are kept to a limited duration.

Estimating an Open Endpoint Voltage Value

One limitation in using overdrive sequences to learn the voltage range for an actuator's effective stroke is that the controller cannot be relied upon to command the actuator to overdrive to the open position following an overdrive to its closed position. This may happen where, for example, the controller has overdriven the actuator to close, but then determines that the temperature setpoint is being met and, therefore, that no further movement is required. In some embodiments, the polarity of the actuator may be reversed. Where polarity is reversed, the overdrive sequence begins with an overdrive open, but may not reliably overdrive to the closed position thereafter. In order to address these limitations, the following description is for a method of estimating the voltage open value (or closed voltage value, where polarity is reversed) following an initial overdrive closed (or open, for reverse polarity). For the purposes of the following description, the polarity is assumed to be normal.

Figure 8:
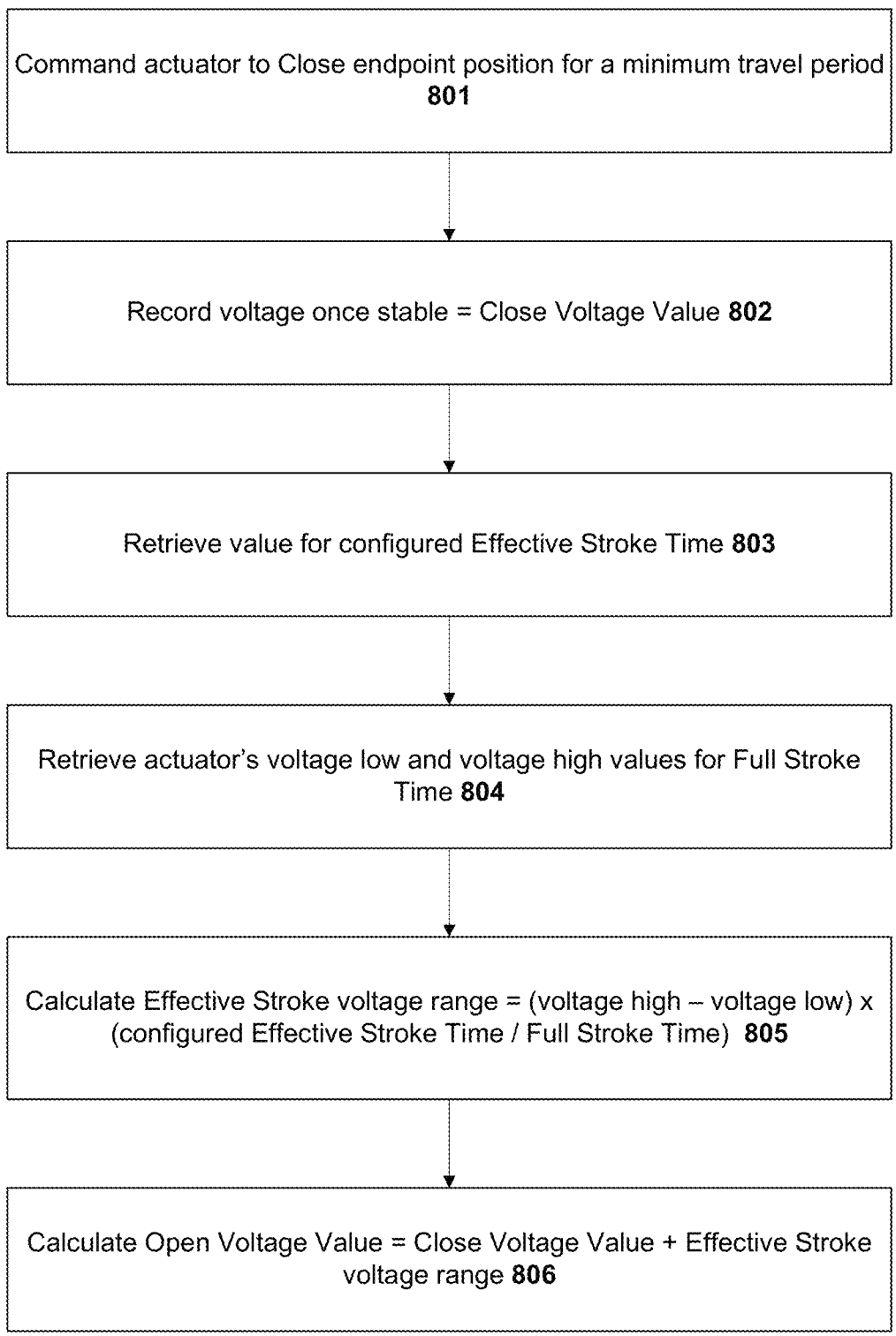
FIG. 8 is a flow diagram of a process for estimating a feedback voltage signal value for a fully open position of an actuator, according to an exemplary embodiment.

FIG. 8 describes a method of estimating an actuator open endpoint voltage value following an overdrive to the close endpoint. Controller 502 commands the actuator to the close endpoint for a minimum travel period 801. The minimum travel period is a duration of time exceeding the actuator's default Full Stroke Time. On expiry of the minimum travel period, controller 502 measures voltage signals from potentiometer 516 and records the close voltage value once the measured voltage becomes stable 802. In some embodiments, a stable voltage is a measured voltage value that is within a range of 10 mV between each measurement sample. Controller 502 retrieves the actuator's configured Effective Stroke Time 803. The configured Effective Stroke Time is a value entered by the installer into the actuator's hardware settings and is intended to account for any physical limitations on the actuator's default full range of movement. For example, the actuator may have a default full stroke range of 90 degrees and a default Full Stroke Time of 60 seconds, but may have been installed for only 45 degrees of rotation. In this example, the installer may configure the Effective Stroke Time to be half the duration of Full Stroke Time, i.e., an Effective Stroke Time of 30 seconds. Controller 502 retrieves from the actuator's hardware settings the voltage low and voltage high values associated with the actuator's default Full Stroke Time and default full range 804. These voltage values are provided by the manufacturer. Controller 502 calculates the Effective Stroke voltage range, by subtracting the default voltage low value from the default voltage high value and multiplying the result by the fraction of Effective Stroke Time divided by Full Stroke Time 805. For example, if a 90 degree actuator has a Full Stroke Time of 60 seconds and has been installed for only 45 degrees of rotation, the installer may configure its Effective Stroke Time to be 30 seconds. If the actuator's default voltage range for a full stroke is between 0.3V and 1.9V (i.e., a full voltage range of 1.6V), the calculated voltage range for an Effective Stroke would be 30/60×1.6V=0.8V. Controller 502 then calculates the open voltage value by adding the calculated voltage range to the measured closed voltage value 806. The calculated open voltage value is therefore determined to be the voltage expected when the actuator overdrives to the open endpoint. The method described may be used to determine an Effective Stroke range of an actuator that has been mounted for a full range of movement as well as for an actuator mounted for less than a full range of movement. In the former case, the disclosed method improves the accuracy of the open voltage value, which would otherwise be based on the default hardware voltage values.

Determining the True Stroke Time

Figure 9:
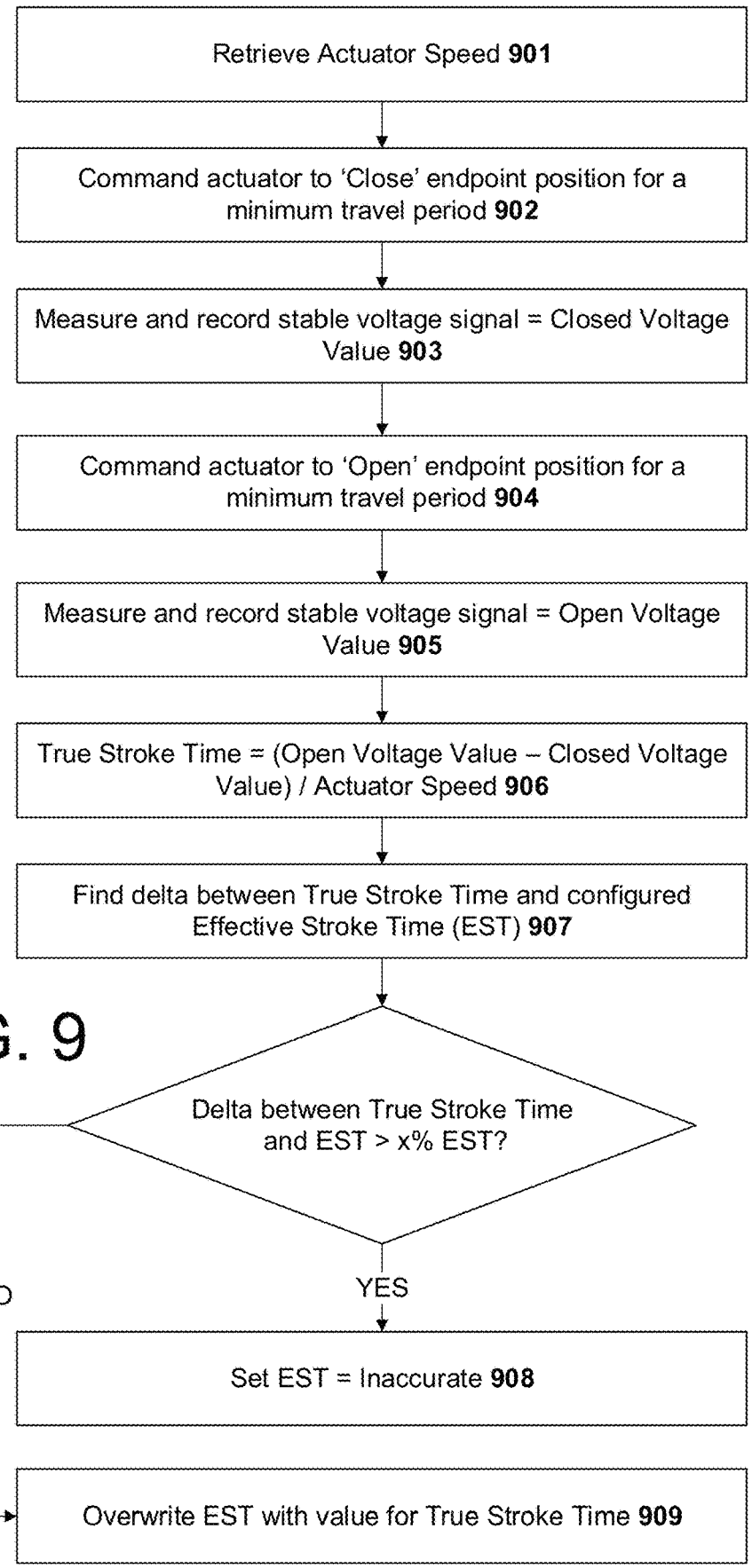
FIG. 9 is a flow diagram of a process for a method of determining a true stroke time of an actuator in its installed condition, according to an exemplary embodiment.

Turning now to FIG. 9, a method is described for determining a True Stroke Time of an incremental actuator in its installed condition, updating a configured Effective Stroke Time, and determining whether the configured Effective Stroke Time is inaccurate.

An actuator's default Full Stroke Time is a value provided by the manufacturer and does not take into account any physical restrictions on its movement in its installed condition. For this reason, an installer must configure the actuator's Effective Stroke Time to take account of any such physical restrictions. The configured Effective Stroke Time is the installer's estimate of the time the actuator will actually take to travel its full permitted range of movement. For example, an actuator with a default Full Stroke Time of 120 seconds in respect of a full rotation range of 90 degrees may be installed on a damper that allows for only 45 degrees of rotation. An installer may configure the actuator's Effective Stroke Time as 60 seconds (45/90 degrees×120 seconds). Accurate configuration of an actuator's Effective Stroke Time is essential for the controller to accurately estimate the actuator's current incremental position from its physical endpoints. The following method describes a means of automatically updating a configured Effective Stroke Time, based on voltage signals received from potentiometer 516, and, where there is a discrepancy above a threshold, determining that a configured Effective Stroke Time is inaccurate. For the purposes of the following description, the actuator's polarity is assumed to be normal, although it should be understood that the method may also be applied to a situation where the polarity is reversed. In such a situation, reference to the close endpoint should be understood to refer to the open endpoint, and vice versa.

Upon starting the actuator after installation, controller 502 retrieves the actuator's speed of movement 901 from hardware manager 520. This value is derived from the default hardware values for the actuator's full stroke range and is assumed to be relatively fixed. Controller 502 commands the actuator to move to the close endpoint for a minimum travel period 902. The minimum travel period is a duration of time that exceeds the actuator's default Full Stroke Time. For example, if the actuator's default Full Stroke Time is 60 seconds, the minimum travel period required may be a duration of 90 seconds. This minimum travel period ensures that the actuator reliably reaches its close endpoint. Controller 502 commands the actuator to move first to the close endpoint. Controller 502 measures the voltage input signal from potentiometer 516 and, upon detecting a stable voltage signal, records that voltage as the actuator's Closed Voltage Value 903. In some embodiments, a stable voltage is a measured voltage value that is within a range of 10 mV between each measurement sample. Controller 502 then commands the actuator to move to the open endpoint for a minimum travel period 904. Controller 502 measures the voltage input signal from potentiometer 516 and, upon detecting a stable voltage signal, records that voltage as the actuator's Open Voltage Value 905. Controller 502 calculates the True Stroke Time by deducting the Closed Voltage Value from the Open Voltage Value and dividing the result by the actuator's speed 906. Controller 502 compares the True Stroke Time with the configured Effective Stroke Time and determines the difference in their values 907. If controller 502 determines that this difference in value is greater than a certain percentage of the configured Effective Stroke Time (e.g., by 10%), controller 502 sets the configured Effective Stroke Time as inaccurate 908. If controller 502 determines that the difference in value is less than the certain percentage of configured Effective Stroke Time, controller 502 overwrites the configured Effective Stroke Time with the value for True Stroke Time 909.

Determining an Actual Range of Movement

Figure 10:
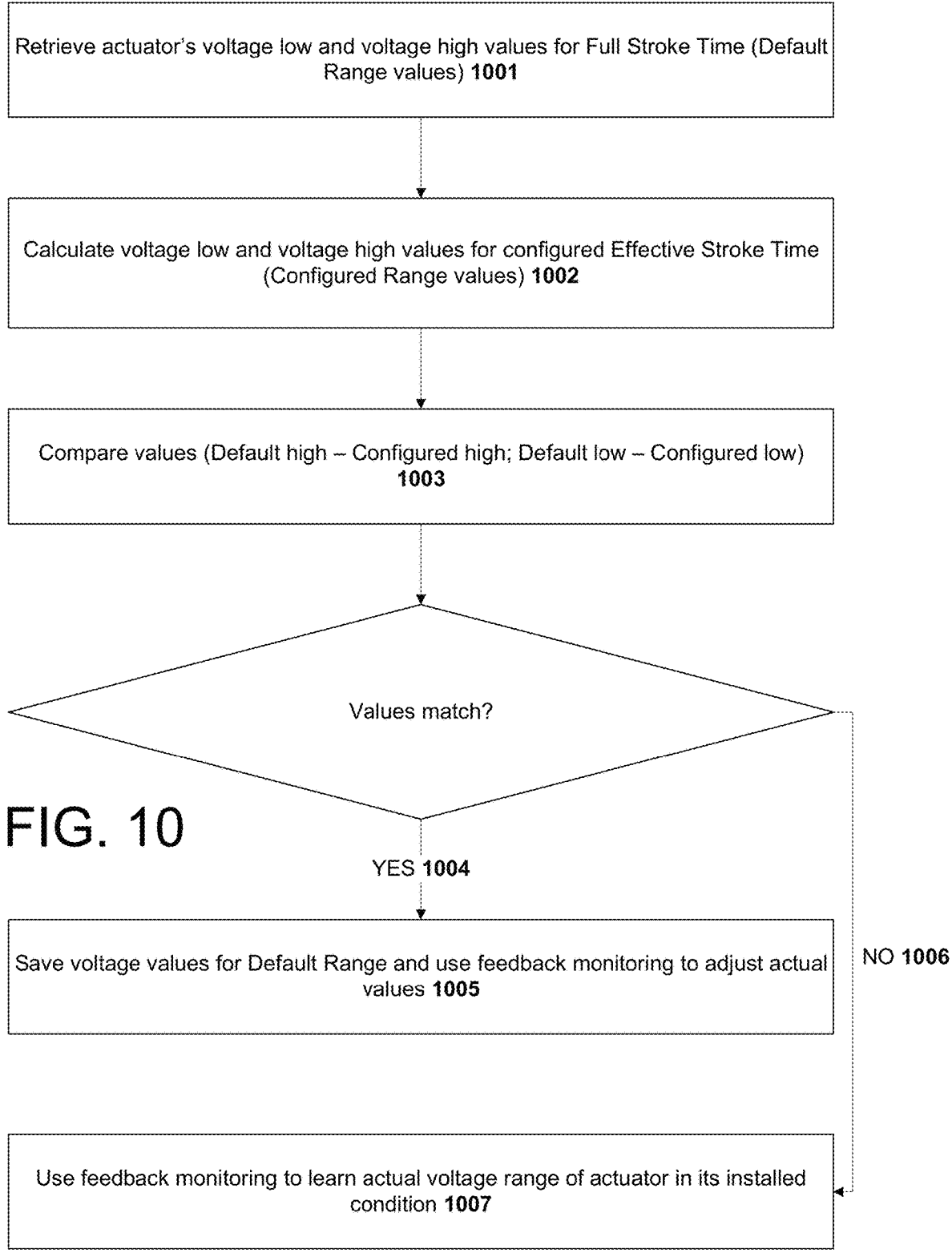
FIG. 10 is a flow diagram of a process for a method of detecting if an actuator has been installed for less than its full range of movement, according to an exemplary embodiment.
Figure 11:
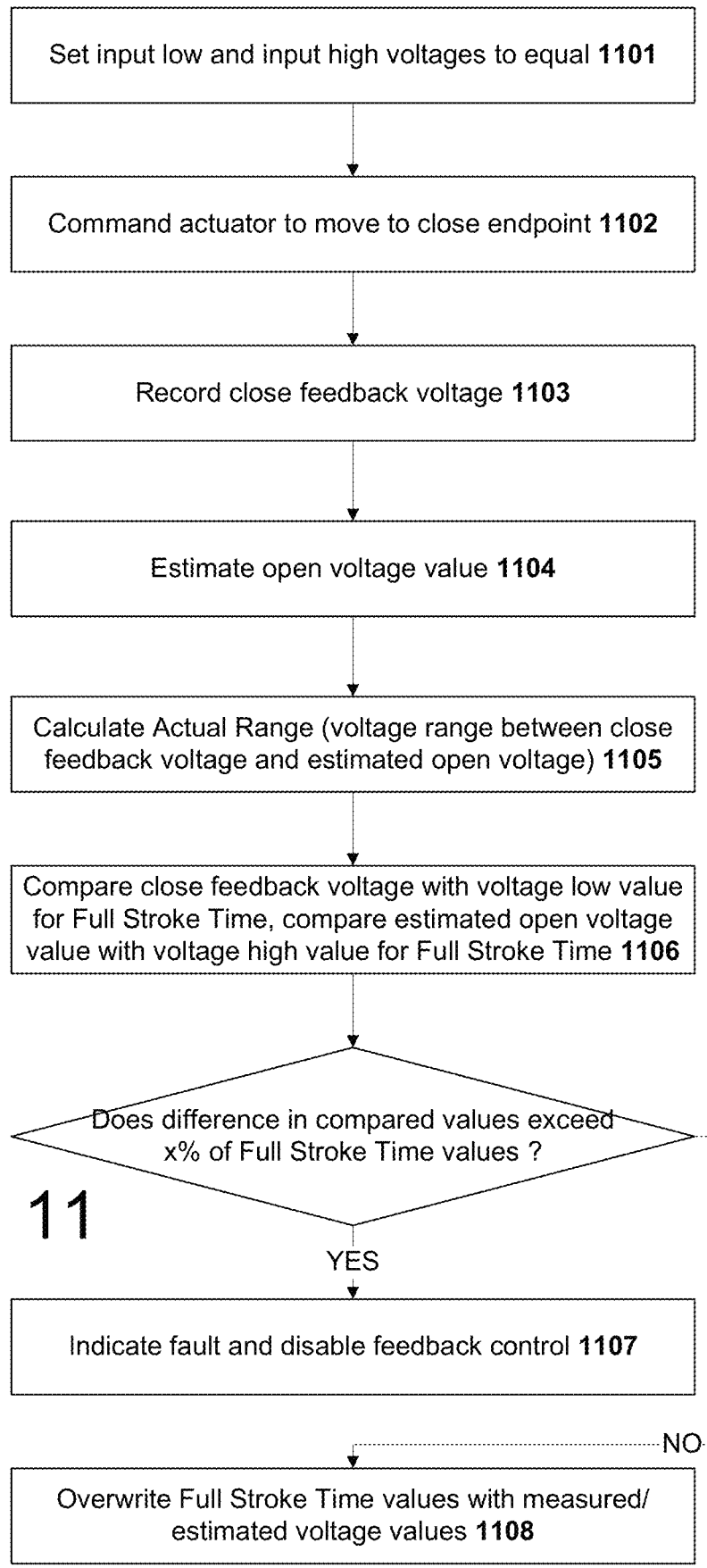
FIG. 11 is a flow diagram of a process for a method of determining an actual range of an actuator in its installed condition, according to an exemplary embodiment.

Turning now to FIG. 10 and FIG. 11, methods of determining the actual range of an incremental actuator are described. One implementation of the present disclosure is a method of automatically detecting whether an actuator has been installed for its full range of movement, and, where it is determined that the actuator has not been installed for its full range, a further method of calculating the actuator's actual range.

FIG. 10 describes a method of determining if an incremental actuator has been installed for less than its full range of movement. When the actuator is started following installation, controller 502 loads the actuator's default input low and input high voltage values associated with the actuator's default Full Stroke Time (provided by the manufacturer) 1001. Controller 502 calculates a second set of input low and input high voltage values associated with the actuator's configured Effective Stroke Time (set by the installer) 1002. Controller 502 then compares the two sets of voltage values 1003, i.e., the default input low value is compared with the configured input low value, and the default input high value is compared with the configured input high value. If the corresponding values match or their differences lie within a certain tolerance 1004, controller 502 determines that the actuator has been installed for its full range of movement, loads the default input low and input high voltage values in the hardware settings, and uses subsequent voltage feedback monitoring to adjust the actual values to be more accurate 1005. If these values do not match and their differences lie outside a certain tolerance 1006, controller 502 uses feedback voltage signals to learn the actuator's actual input low and input high voltage values representing the true range of the actuator.

FIG. 11 describes a method of determining the true range of an actuator that has been installed for less than its full range of movement. Without knowing the actual range of an actuator that has been installed for less than its full range of movement, the incremental controller cannot accurately calculate incremental positions and movement commands. For example, if an actuator with a 90 degree full range of rotation is mounted for only 45 degrees of movement and its default voltage range is 0.3V to 1.9V (a range of 1.6V), the 45 degree voltage range (0.8V) could fall anywhere between the two default voltage values and the controller has no way of determining the actual voltage endpoints for the 0.8V range. In order to determine the actual voltage range, controller 502 sets the input low and input high voltage values to equal values 1101. Controller 502 then commands the actuator to move to its close endpoint 1102. Controller 502 receives feedback voltage from potentiometer 516 and records the close voltage value, once the measured voltage has stabilized 1103. Controller 502 then estimates the open voltage value 1104, as further described above in relation to FIG. 8. The actual range is then determined to be the range between the measured closed voltage value and the estimated open voltage value 1105. Controller 502 compares the measured closed voltage value with the voltage low value associated with the actuator's default Full Stroke Time and, similarly, compares the estimated open voltage value with the voltage high value associated with the default Full Stroke Time 1106. If the two sets of voltage values differ by a certain percentage of the Full Stroke Time values (e.g., by 20%) controller 502 disables feedback control and indicates a fault 1107. If the difference measured is less than the allowed percentage, controller 502 overwrites the Full Stroke Time values with the measured and estimated voltage values 1108.

Detecting a Mechanical stall or Decoupled Condition

Figure 12:
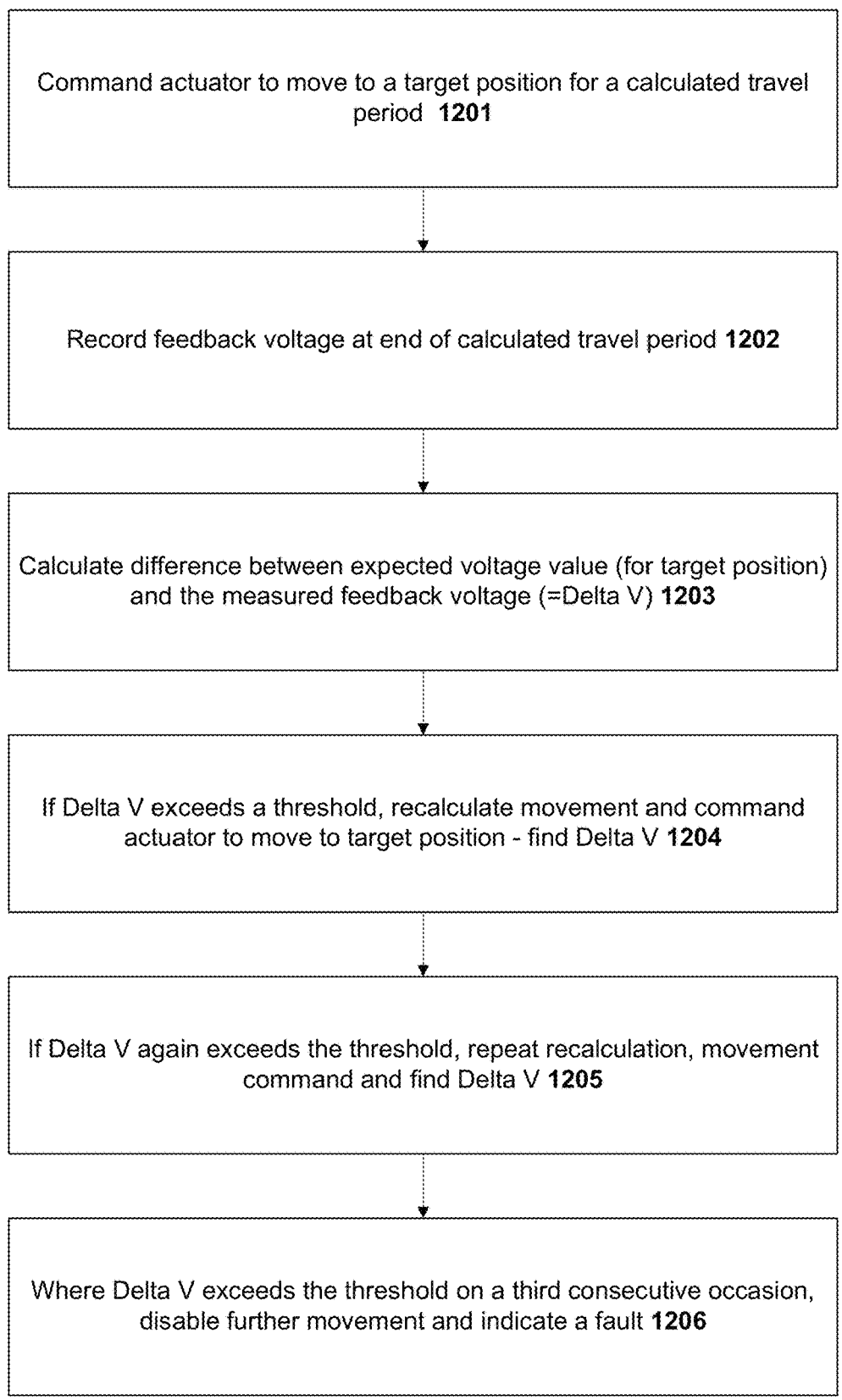
FIG. 12 is a flow diagram of a process for detecting a blockage, stall, or decoupling of an actuator, according to an exemplary embodiment.

Turning now to FIG. 12, a method of detecting a mechanical stall, blockage, or decoupled condition of an incremental actuator using voltage feedback analysis is described.

Controller 502 commands the actuator to move to a target position for a calculated travel period 1201. This target position is associated by the controller with an expected voltage value that has been determined based on the actuator's configured Effective Stroke Time and associated voltage range. At the end of the calculated travel period, controller 502 measures the feedback voltage received from potentiometer 516 1202. Controller 502 calculates the difference between the expected voltage value and the measured feedback voltage value 1203. If the difference between these values exceeds a certain threshold (e.g., is greater than 10% of the expected voltage value), controller 502 recalculates the movement, commands the actuator to move again to the target position, and calculates the difference between the expected voltage value and the measured feedback voltage value 1204. If the difference observed again exceeds the threshold, controller 502 again recalculates the movement, commands the move, and calculates the difference between the expected voltage value and the measured feedback voltage value 1205. If the difference observed remains in excess of the threshold for the third consecutive time, controller 502 disables further movement of the actuator and indicates a fault 1206. This situation may occur when a damper has become blocked or otherwise stuck and the controller disables movement to prevent physical damage to the actuator or damper.

Another implementation of the present disclosure is a method of estimating a voltage value for a position endpoint of an incremental actuator. The method includes driving the actuator to a first position endpoint for a minimum travel period that exceeds a value for a full stroke time of the actuator, measuring a voltage signal received from a potentiometer upon stopping the actuator at the expiration of the minimum travel period, retrieving from a data storage a value for a configured stroke time of the actuator and a value for a full stroke time of the actuator, retrieving from a data storage a full stroke voltage range associated with a full stroke time of the actuator, calculating an effective stroke voltage range by multiplying the full stroke voltage range by the configured stroke time and dividing the result by the full stroke time, and estimating a voltage value for a second position endpoint by adding the effective stroke voltage range to the value of the measured voltage signal.

Another implementation of the present disclosure is a method for determining a true stroke time of an actuator. The method includes retrieving a speed of movement of the actuator from a data storage, driving the actuator to a first position endpoint for a minimum travel period that exceeds a value for a full stroke time of the actuator, determining a first voltage value for the first position endpoint by measuring a voltage signal received from a potentiometer upon stopping the actuator at the expiration of the minimum travel period, driving the actuator to a second position endpoint for a minimum travel period that exceeds a value for a full stroke time of the actuator, determining a second voltage value for the second position endpoint by measuring a voltage signal received from a potentiometer upon stopping the actuator at the expiration of the minimum travel period, calculating a true stroke time for the actuator by subtracting the first voltage value from the second voltage value and dividing the result by the actuator's speed of movement, calculating a difference between the true stroke time for the actuator and a configured stroke time for the actuator and comparing the difference with a threshold, based on a determination that the calculated difference exceeds the threshold, setting the configured stroke time for the actuator as inaccurate, and based on a determination that the calculated difference does not exceed the threshold, overwriting the value for the configured stroke time with the value for the true stroke time.

Another implementation of the present disclosure is a method of detecting that an actuator is installed for less than its full range of movement. The method includes retrieving from a data storage a first voltage high value and a first voltage low value, each first value associated with the actuator's full stroke time, calculating, based on a configured stroke time, a second voltage high value and a second voltage low value, determining that there is a difference between the first voltage high value and the second voltage high value and a difference between the first voltage low value and the second voltage low value, and based on the determination, detecting that the actuator is installed for less than its full range of movement and further determining the voltage high value and voltage low value for the lesser range by measuring voltage signals received from a potentiometer.

Another implementation of the present disclosure is a method of determining an actual movement range of an incremental actuator. The method includes setting the voltage values associated with the position endpoints of the actuator to equal values, driving the actuator to a first position endpoint for a minimum travel period that exceeds a value for a full stroke time of the actuator, determining a first voltage value for the first position endpoint by measuring a voltage signal received from a potentiometer upon stopping the actuator at the expiration of the minimum travel period, estimating a second voltage value for a second position endpoint, determining that the actual movement range of the actuator is the range between the first voltage value and the second voltage value, comparing the voltage values for the actual movement range with the voltage values associated with the actuator's full stroke time, based on that comparison, determining whether the difference in values exceeds a threshold, based on a determination that the difference exceeds the threshold, making a determination that there is a fault, and based on a determination that the difference does not exceed the threshold, overwriting the voltage values associated with the actuator's full stroke time with the voltage values for the actual movement range.

Another implementation of the present disclosure is a method of detecting a blocked, stalled, or decoupled condition of an incremental actuator. The method includes driving the actuator, on at least two consecutive occasions, to a target position for a calculated travel period, measuring a voltage signal received from a potentiometer at the expiry of the calculated travel period, calculating a difference between a voltage value associated with the target position and the measured voltage, comparing the calculated difference to a threshold, and based on a determination that the calculated difference exceeds the threshold on a number of consecutive occasions, disabling further movement of the actuator and indicating a fault condition of the actuator.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for controlling operation of an actuator in a heating, ventilation, or air conditioning (HVAC) system, the controller comprising a processing circuit configured to:
receive, via a position sensor communicatively coupled to the actuator, a first voltage value, the first voltage value indicative of a first position of the actuator;
provide a control signal to the actuator to move to a second position;
in response to the actuator moving to the second position, determine that the actuator is located in a different position than the second position based on a second voltage value via the position sensor; and
automatically perform a fault correction process to calculate an updated stroke range of the actuator, wherein the fault correction process comprises:
determining an initial stroke range indicative of a time period for the actuator to move from a first endpoint to a second endpoint;
instructing the actuator to move to the first endpoint for a first period greater than the initial stroke range;
receiving a first test voltage signal at the first endpoint;
instructing the actuator to move to the second endpoint for a second period greater than the initial stroke range;
receiving a second test voltage signal at the second endpoint; and
calculating the updated stroke range based on the initial stroke range, the first test voltage signal, and the second test voltage signal.

2. The controller of claim 1, wherein:
the position sensor is a potentiometer; and
the controller is configured to receive a plurality of voltage signals from the potentiometer, each of the plurality of voltage signals corresponding to a location between the first endpoint and the second endpoint, the plurality of voltage signals comprising the first voltage value and the second voltage value.

3. The controller of claim 1, wherein calculating the updated stroke range comprises calculating an effective stroke time, wherein the effective stroke time is a calculated period for the actuator to move from the first endpoint to the second endpoint.

4. The controller of claim 3, wherein calculating the updated stroke range comprises:
performing a calculation, the calculation comprising:

$$SR_U[V] = (V_H - H_L) * \left[\frac{ST_E}{ST_F}\right]$$

wherein:
$SR_U$ is the updated stroke range, $V_H$ is the first test voltage signal, $V_H$ is the second test voltage signal, $ST_E$ is the effective stroke time, and $ST_F$ is a full stroke time; and
the full stroke time is a predetermined period for the actuator to complete the initial stroke range.

5. The controller of claim 1, wherein the position sensor is a potentiometer.

6. A controller for controlling operation of an actuator in a heating, ventilation, or air conditioning (HVAC) system, the controller comprising a processing circuit configured to:
receive, via a position sensor communicatively coupled to the actuator, a first voltage value, the first voltage value indicative of a first position of the actuator;
provide a control signal to the actuator to move to a second position;
in response to the actuator moving to the second position, determine that the actuator is located in a different position than the second position based on a second voltage value via the position sensor; and
automatically perform a fault correction process to calculate an updated stroke range of the actuator, wherein automatically performing the fault correction process comprises:
determining that the actuator is located substantially close to the second position;
determining that a fault has occurred due to actuator drift; and
performing the fault correction process to correct for the actuator drift.

7. The controller of claim 6, wherein performing the fault correction process to correct for the actuator drift comprises performing a periodic overdrive sequence to resynchronize the actuator.

8. A method for controlling operation of an actuator in a heating, ventilation, or air conditioning (HVAC) system, the method comprising:
receiving, via a position sensor communicatively coupled to the actuator, a first voltage value, the first voltage value indicative of a first position of the actuator;
providing a control signal to the actuator to move to a second position;
in response to the actuator moving to the second position, determining that the actuator is located in a different position than the second position based on a second voltage value via the position sensor; and automatically performing a fault correction process to calculate an updated stroke range of the actuator, wherein the fault correction process comprises:

determining an initial stroke range indicative of a time period for the actuator to move from a first endpoint to a second endpoint;

instructing the actuator to move to the first endpoint for a first period greater than the initial stroke range;

receiving a first test voltage signal at the first endpoint;

instructing the actuator to move to the second endpoint for a second period greater than the initial stroke range;

receiving a second test voltage signal at the second endpoint; and calculating the updated stroke range based on the initial stroke range, the first test voltage signal, and the second test voltage signal.

9. The method of claim 8, wherein:

the position sensor is a potentiometer; and the method further comprises receiving a plurality of voltage signals from the potentiometer, each of the plurality of voltage signals corresponding to a location between the first endpoint and the second endpoint, the plurality of voltage signals comprising the first voltage value and the second voltage value.

10. The method of claim 8, wherein calculating the updated stroke range comprises calculating an effective stroke time, wherein the effective stroke time is a calculated period for the actuator to move from the first endpoint to the second endpoint.

11. The method of claim 10, wherein calculating the updated stroke range comprises:

performing a calculation, the calculation comprising:

$$SL_U[V] = (V_H - V_L) * \left[\frac{ST_E}{ST_F}\right]$$

wherein:

$ST_U$ is the updated stroke range, $V_H$ is the first test voltage signal, $V_H$ is the second test voltage signal, $ST_E$ is the effective stroke time, and $ST_F$ is a full stroke time, and the full stroke time is a predetermined period for the actuator to complete the initial stroke range.

12. The method of claim 8, wherein the position sensor is a potentiometer.

13. A method for controlling operation of an actuator in a heating, ventilation, or air conditioning (HVAC) system, the method comprising:

receiving, via a position sensor communicatively coupled to the actuator, a first voltage value, the first voltage value indicative of a first position of the actuator;

providing a control signal to the actuator to move to a second position;

in response to the actuator moving to the second position, determining that the actuator is located in a different position than the second position based on a second voltage value via the position sensor; and automatically performing a fault correction process to calculate an updated stroke range of the actuator, wherein automatically performing the fault correction process comprises:

determining that the actuator is located substantially close to the second position;

determining that a fault has occurred due to actuator drift; and performing the fault correction process to correct for the actuator drift.

14. The method of claim 13, wherein performing the fault correction process to correct for the actuator drift comprises performing a periodic overdrive sequence to resynchronize the actuator.

15. A control system for controlling operation of an actuator in a heating, ventilation, or air conditioning (HVAC) system, the control system comprising:

the actuator communicatively coupled to a position sensor; and a controller comprising a processing circuit configured to:

receive, via the position sensor, a first voltage value, the first voltage value indicative of a first position of the actuator;

provide a control signal to the actuator to move to a second position;

in response to the actuator moving to the second position, determine that the actuator is located in a different position than the second position based on a second voltage value via the position sensor; and automatically perform a fault correction process to calculate an updated stroke range of the actuator, wherein the fault correction process comprises:

determining an initial stroke range indicative of a time period for the actuator to move from a first endpoint to a second endpoint;

instructing the actuator to move to the first endpoint for a first period greater than the initial stroke range;

receiving a first test voltage signal at the first endpoint;

instructing the actuator to move to the second endpoint for a second period greater than the initial stroke range;

receiving a second test voltage signal at the second endpoint; and calculating the updated stroke range based on the initial stroke range, the first test voltage signal, and the second test voltage signal.

16. The control system of claim 15, wherein:

the position sensor is a potentiometer; and the controller is configured to receive a plurality of voltage signals from the potentiometer, each of the plurality of voltage signals corresponding to a location between the first endpoint and the second endpoint, the plurality of voltage signals comprising the first voltage value and the second voltage value.

17. The control system of claim 15, wherein calculating the updated stroke range comprises calculating an effective stroke time, wherein the effective stroke time is a calculated period for the actuator to move from the first endpoint to the second endpoint.

18. The control system of claim 17, wherein calculating the updated stroke range comprises:

performing a calculation, the calculation comprising:

$$SL_U[V] = (V_H - V_L) * \left[\frac{ST_E}{ST_F}\right]$$

wherein:

$SR_U$ is the updated stroke range, $V_H$ is the first test voltage signal, $V_H$ is the second test voltage signal, $ST_E$ is the effective stroke time, and $ST_F$ is a full stroke time, the full stroke time is a predetermined period for the actuator to complete the initial stroke range.

19. The control system of claim 15, wherein the position sensor is a potentiometer.

20. A control system for controlling operation of an actuator in a heating, ventilation, or air conditioning (HVAC) system, the control system comprising:
the actuator communicatively coupled to a position sensor; and
a controller comprising a processing circuit configured to:
receive, via the position sensor, a first voltage value, the first voltage value indicative of a first position of the actuator;
provide a control signal to the actuator to move to a second position;
in response to the actuator moving to the second position, determine that the actuator is located in a different position than the second position based on a second voltage value via the position sensor; and
automatically perform a fault correction process to calculate an updated stroke range of the actuator, wherein automatically performing the fault correction process comprises:
determining that the actuator is located substantially close to the second position;
determining that a fault has occurred due to actuator drift; and
performing the fault correction process to correct for the actuator drift.

* * * * *